US012619085B2

(12) United States Patent
Weng et al.

(10) Patent No.: US 12,619,085 B2
(45) Date of Patent: May 5, 2026

(54) OPTICAL SYSTEM

(71) Applicant: Actutek Corporation, Taoyuan City (TW)

(72) Inventors: Chih-Wei Weng, Taoyuan City (TW); Yung-Hsien Yeh, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 314 days.

(21) Appl. No.: 18/468,254

(22) Filed: Sep. 15, 2023

(65) Prior Publication Data

US 2024/0094501 A1     Mar. 21, 2024

Related U.S. Application Data

(60) Provisional application No. 63/406,916, filed on Sep. 15, 2022.

(51) Int. Cl.
*G02B 27/01* (2006.01)
*F21V 8/00* (2006.01)
(Continued)

(52) U.S. Cl.
CPC ....... *G02B 27/0176* (2013.01); *G02B 6/0006* (2013.01); *G02B 6/0028* (2013.01); *G02B 7/08* (2013.01); *G02B 7/36* (2013.01); *G02B 27/0172* (2013.01); *G02B 27/0179* (2013.01); *G02B 27/646* (2013.01); *G03B 5/00* (2013.01); *G06F 3/013* (2013.01); *G09G 3/001* (2013.01); *H01F 7/081* (2013.01); *H04N 23/54* (2023.01); *H04N 23/55* (2023.01); *H04N 23/6812* (2023.01); *G02B*

*2027/0112* (2013.01); *G02B 2027/015* (2013.01); *G02B 2027/0159* (2013.01); *G02B 2027/0178* (2013.01);
(Continued)

(58) Field of Classification Search
CPC .............. G02B 27/0176; G02B 6/0006; G02B 6/0028; G02B 7/08; G02B 7/36; G02B 27/0172; G02B 27/0179; G02B 27/646; G02B 2027/0112; G02B 2027/015; G02B 2027/0159; G02B 2027/0178; G02B 2027/0187; G02B 2207/101; G02B 27/01; G02B 2027/0138; G02B 7/00; G02B 7/09; G03B 5/00; G03B 2205/0076; G03B 30/00; G03B 13/36; G06F 3/013; G09G 3/001; G09G 2354/00; H01F 7/081; H04N 23/54; H04N 23/55; H04N 23/6812; H04N 23/00; H02K 33/00
See application file for complete search history.

(56) References Cited

U.S. PATENT DOCUMENTS

2008/0211916 A1 *   9/2008   Ono ........................ H04N 23/20
                                                    348/E5.09
2009/0262213 A1 *   10/2009   Watanabe ............ H04N 23/611
                                                    348/222.1

(Continued)

*Primary Examiner* — Abdelaaziz Tissire
(74) *Attorney, Agent, or Firm* — MUNCY, GEISSLER, OLDS & LOWE, P.C.

(57) ABSTRACT

An optical system includes a sensing assembly and a processing circuit. The sensing assembly is configured to sense light and output a sensing signal accordingly. The processing circuit is configured to analyze the sensing signal. The processing circuit is configured to output a main judgment signal to an external circuit according to the sensing signal.

18 Claims, 7 Drawing Sheets

(51) Int. Cl.

| | |
|---|---|
| *G02B 7/08* | (2021.01) |
| *G02B 7/36* | (2021.01) |
| *G02B 27/64* | (2006.01) |
| *G03B 5/00* | (2021.01) |
| *G06F 3/01* | (2006.01) |
| *G09G 3/00* | (2006.01) |
| *H01F 7/08* | (2006.01) |
| *H04N 23/54* | (2023.01) |
| *H04N 23/55* | (2023.01) |
| *H04N 23/68* | (2023.01) |

(52) U.S. Cl.

CPC ................ *G02B 2027/0187* (2013.01); *G02B 2207/101* (2013.01); *G03B 2205/0076* (2013.01); *G09G 2354/00* (2013.01)

(56)     References Cited

U.S. PATENT DOCUMENTS

| | | | | |
|---|---|---|---|---|
| 2011/0080494 A1* | 4/2011 | Mori | ................... | H04N 23/743 |
| | | | | 348/222.1 |
| 2012/0300115 A1* | 11/2012 | Okada | ..................... | G01S 11/12 |
| | | | | 348/E5.045 |
| 2015/0237260 A1* | 8/2015 | Mukunashi | ........ | H04N 23/6815 |
| | | | | 348/208.11 |
| 2015/0304557 A1* | 10/2015 | Choi | ................... | H04N 5/2621 |
| | | | | 348/218.1 |
| 2016/0034019 A1* | 2/2016 | Seo | ......................... | H04N 5/63 |
| | | | | 345/593 |
| 2020/0034640 A1* | 1/2020 | Imbe | ........................ | G06T 1/00 |
| 2020/0375426 A1* | 12/2020 | Wang | ........................ | A47L 9/30 |

* cited by examiner

100A

OPTICAL SYSTEM

CROSS REFERENCE TO RELATED APPLICATIONS

This application claims the benefit of U.S. Provisional Application No. 63/406,916, filed Sep. 15, 2022, the entirety of which is incorporated by reference herein.

BACKGROUND OF THE INVENTION

Field of the Disclosure

The present disclosure relates to an optical system, and in particular it relates to an optical system having a monitoring function.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice for consumers.

BRIEF SUMMARY OF THE INVENTION

According to some embodiments of the disclosure, an optical system is provided and includes a sensing assembly and a processing circuit. The sensing assembly is configured to sense a light beam and output a sensing signal accordingly. The processing circuit is configured to analyze the sensing signal. The processing circuit is configured to output a main judgment signal to an external circuit according to the sensing signal.

According to some embodiments, the optical system further includes a driving assembly and an optical element. The light beam passes through the optical element and is received by the sensing assembly. The driving assembly is configured to drive the optical element to move so as to change the characteristics of the light beam incident on the sensing assembly.

According to some embodiments, the sensing signal includes a first sensing signal. The sensing assembly periodically outputs the first sensing signal at a first interval according to the light beam.

According to some embodiments, the first interval is less than 0.1 seconds.

According to some embodiments, the processing circuit is configured to determine whether there is a difference between the first sensing signals that are adjacent but at different time points. The processing circuit is configured to determine whether there is a difference in the first sensing signal of a first time point, a second time point and a third time point. The interval between the first time point and the second time point is equal to the first interval. The interval between the second time point and the third time point is equal to the first interval.

According to some embodiments, when the processing circuit determines that there is a difference in the first sensing signal from the first time point to the third time point, an enable signal is output.

According to some embodiments, the driving assembly is configured to change the state of the optical element so that there is a difference in the first sensing signal at different time points. The driving assembly changes the state of the optical element so that the first sensing signal at different time points has a trigger signal. The processing circuit is configured to output the enable signal according to the trigger signal.

According to some embodiments, the sensing signal further includes a second sensing signal. The sensing assembly outputs the second sensing signal to the processing circuit according to the enable signal.

According to some embodiments, the driving assembly is configured to periodically change the state of the optical element at a second interval to generate a difference in the first sensing signal. The first interval is different from the second interval. The first interval is less than the second interval. The second interval is less than five minutes.

According to some embodiments, the processing circuit is configured to determine whether there is a difference in the second sensing signals that are adjacent but at different time points. The processing circuit is configured to determine whether there is a difference in the second sensing signal at a fourth time point and a fifth time point. The interval between the fourth time point and the fifth time point is equal to the second interval.

According to some embodiments, when the processing circuit determines that there is a difference between the second sensing signals that are adjacent but at different time points, the processing circuit outputs the main judgment signal.

According to some embodiments, the processing circuit includes a first frame buffer configured to receive the first sensing signal. The processing circuit further includes a second frame buffer configured to receive the second sensing signal. A capacity of the first frame buffer is different from a capacity of the second frame buffer. The capacity of the first frame buffer is greater than the capacity of the second frame buffer.

According to some embodiments, the processing circuit further includes a comparator. The comparator is configured to receive the first sensing signals and determine whether there is a difference between the first sensing signals that are adjacent but at different time points, so as to output the enable signal. The comparator is configured to receive the second sensing signals and determine whether there is a difference between the second sensing signals that are adjacent but at different time points, so as to output the main judgment signal.

According to some embodiments, the sensing assembly includes a first sensing unit configured to output the first sensing signal according to the light beam. The sensing assembly includes a second sensing unit configured to output the second sensing signal according to the light beam.

According to some embodiments, the first sensing unit has a plurality of first base units. The second sensing unit has a plurality of second base units. The first base units and the second base units are arranged in different ways. A number of the first base units is different from a number of the second base units.

According to some embodiments, after the optical system completes a startup process, the first sensing unit remains in an activated state. When the first sensing unit remains in the activated state, the first sensing unit continues to receive the light beam and correspondingly outputs the first sensing signal to the first frame buffer. After the optical system completes the startup process, if the sensing assembly does not receive the enable signal, the second sensing unit remains in a deactivated state.

According to some embodiments, the first sensing unit is included in the second sensing unit. The sensing assembly has a plate-shaped structure. When viewed in a direction parallel to the sensing assembly, the first base unit overlaps at least a portion of the second base unit.

According to some embodiments, the sensing assembly has a plate-shaped structure. The first sensing unit is included in the second sensing unit. When viewed in a direction perpendicular to the sensing assembly, the first base unit overlaps at least a portion of the second base unit.

According to some embodiments, the sensing assembly has a filter layer, an electronic circuit layer and a photosensitive layer. When viewed in a direction perpendicular to the sensing assembly, the filter layer overlaps the electronic circuit layer and the photosensitive layer.

According to some embodiments, the first base unit has a first photosensitive element which is disposed in the electronic circuit layer. The second base unit has at least one second photosensitive element. When viewed in a direction perpendicular to the sensing assembly, the first photosensitive element overlaps a portion of the at least one second photosensitive element.

The present disclosure provides an optical system, including a fixed assembly, a movable assembly, a driving assembly, a sensing assembly and a processing circuit. The movable assembly is movably connected to the fixed assembly. The driving assembly is configured to drive the movable assembly and the optical element to move relative to the fixed assembly. The sensing assembly is configured to sense the light beam with respect to the object to correspondingly output a sensing signal, and the processing circuit is configured to analyze the sensing signal.

When the sensing assembly receives the light beam, the first sensing unit continuously outputs the first sensing signal to the processing circuit. When the processing circuit determines that there is a difference in the first sensing signal at different time points, the processing circuit outputs an enable signal. Then, the second sensing unit of the sensing assembly outputs the second sensing signal to the processing circuit according to the enable signal. When the comparator of the processing circuit determines that there is a difference between the adjacent second sensing signals at different time points, the main judgment signal is output. The main judgment signal is, for example, a warning signal configured to notify the external circuit that an abnormality occurs in the currently observed person.

In the present disclosure, a smaller number of first base units of the first sensing unit are used to sense and output the first sensing signal, and the second base units of the second sensing unit outputs the image signal (the second sensing signal) only after receiving the enable signal, thereby effectively saving the overall power consumption of the sensing assembly, and the observed person can be effectively monitored.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
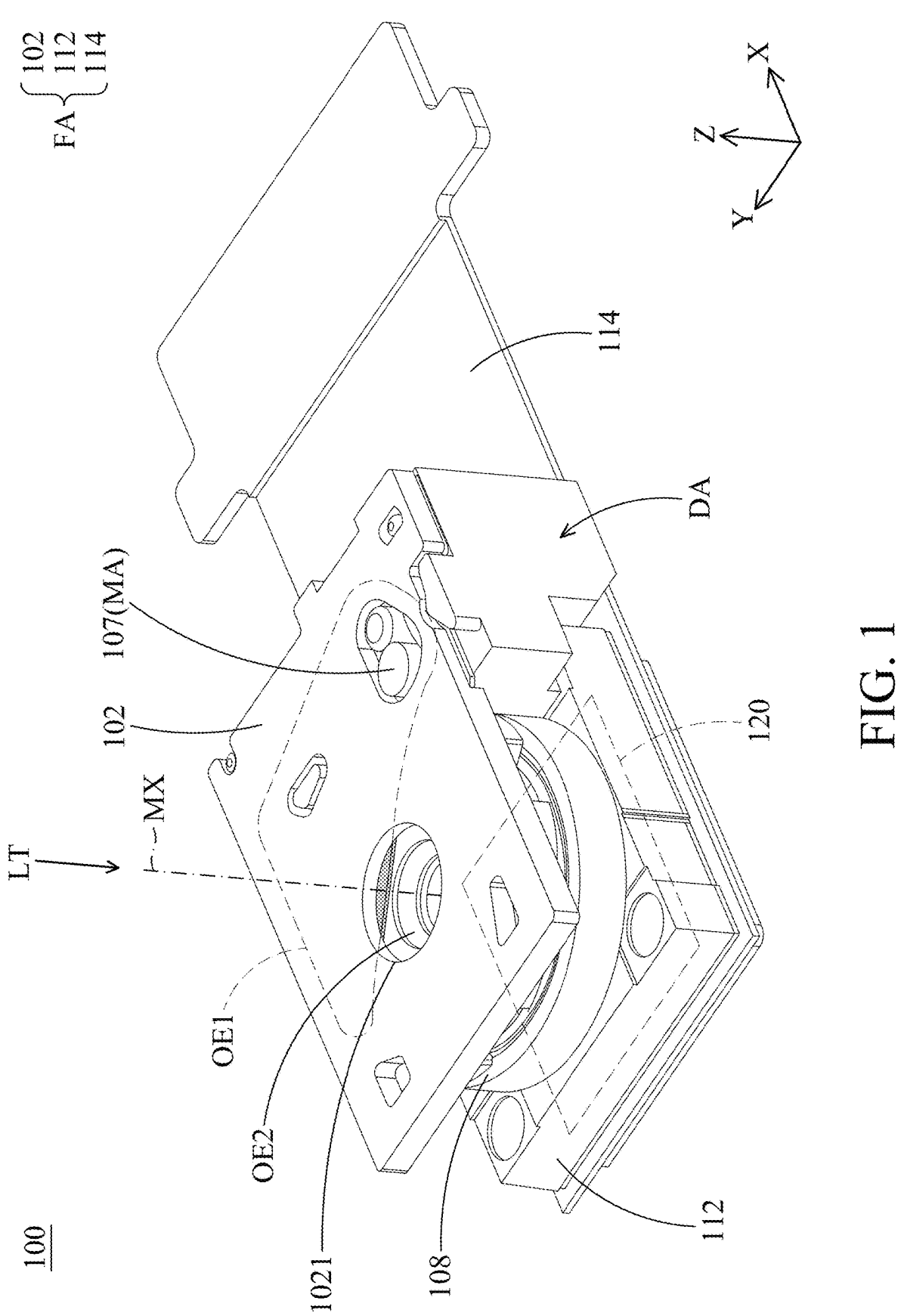
FIG. 1 is a perspective view of an optical system 100 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
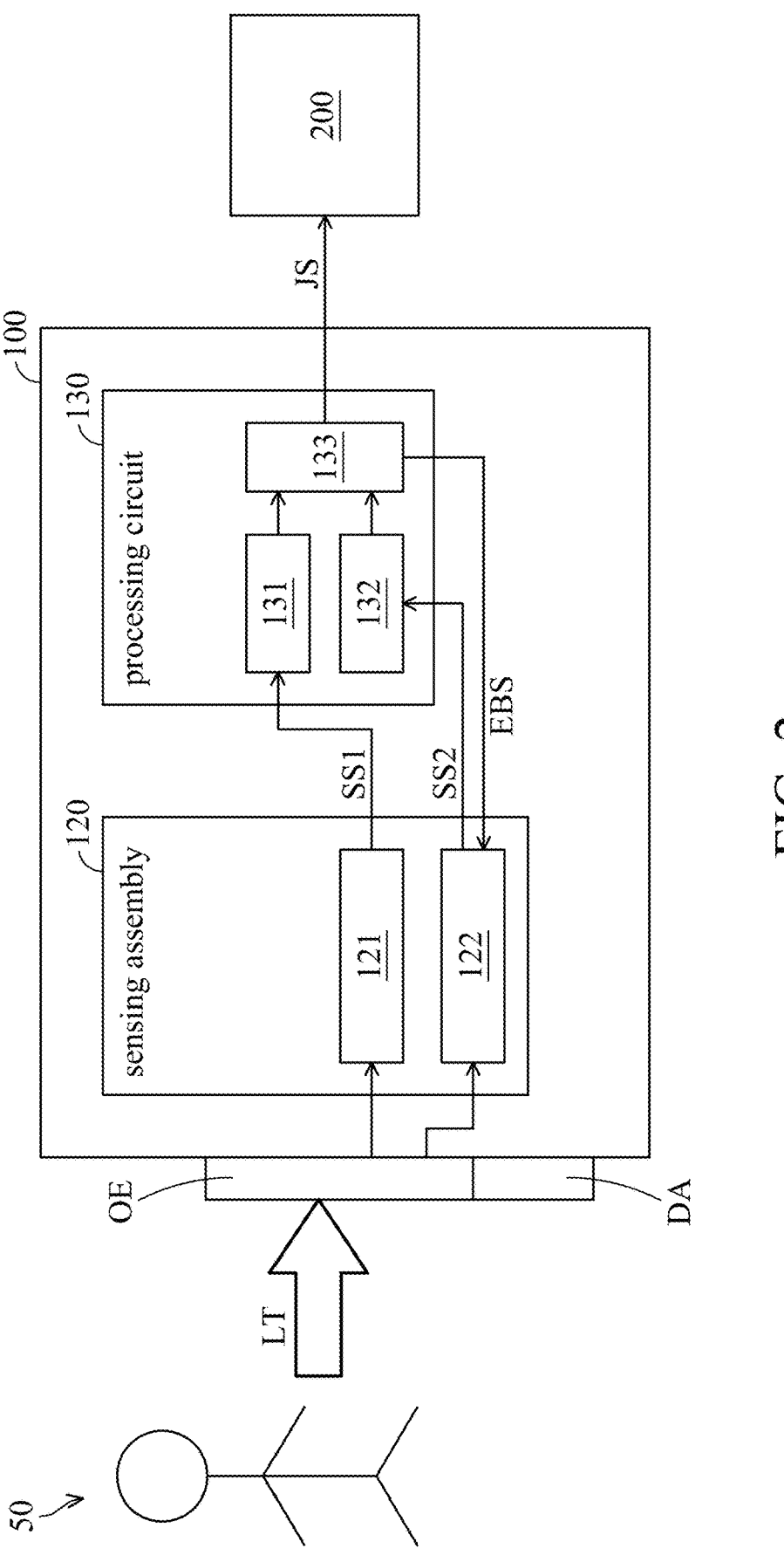
FIG. 2 is a functional block diagram of the optical system 100 according to an embodiment of the present disclosure.

Please refer to FIG. 1 to FIG. 2. FIG. 1 is a perspective view of an optical system 100 according to an embodiment of the present disclosure, and FIG. 2 is a functional block diagram of the optical system 100 according to an embodiment of the present disclosure. The optical system 100 may be an optical camera module configured to hold and drive an optical element. The optical system 100 can be installed in various electronic devices or portable electronic devices, such as smart phones or monitors, so that users can perform image capturing functions.

In this embodiment, the optical system 100 may include a fixed assembly FA, a movable assembly MA and a driving assembly DA. The movable assembly MA is movably connected to the fixed assembly FA. The driving assembly DA is configured to drive the movable assembly MA to move relative to the fixed assembly FA.

In this embodiment, as shown in FIG. 1, the fixed assembly FA includes a covering body 102, a base 112 and a circuit board 114. The covering body 102 is fixed on the housing of the driving assembly DA, and the base 112 and the driving assembly DA are fixed on the circuit board 114.

The movable assembly MA may include a movable part 107 connected to an optical element OE1 and the driving assembly DA. In this embodiment, the optical element OE1 can serve as a light shield piece or a shutter, but it is not limited thereto. In other embodiments, the optical element OE1 may also serve as a filter or aperture.

The optical system 100 may further include a holder 108 disposed on the base 112, and the holder 108 is configured to hold another optical element OE2. In this embodiment, the holder 108 is fixed on the base 112, but it is not limited to this. In other embodiments, the holder 108 can move relative to the base 112 to achieve the auto-focus function.

Furthermore, the optical system 100 may further include a sensing assembly 120, which is disposed between the base 112 and the circuit board 114. The sensing assembly 120 may be an image sensor configured to receive an external light beam to generate a digital image signal.

For example, a first opening 1021 is formed on the covering body 102, and an external light beam LT can travel along a main axis MX and pass through the first opening 1021 to be received by the aforementioned sensing assembly 120 so as to generate a digital image signal. In addition, the driving assembly DA can drive the movable part 107 to drive the optical element OE1 to block the first opening 1021 so as to adjust the amount of light received by the sensing assembly 120. That is, the light beam LT can pass through or pass by the optical element OE1 to be received by the sensing assembly 120.

Next, as shown in FIG. 2, the optical system 100 may face an object 50 (such as an observed person), and the sensing assembly 120 is configured to sense the light beam LT about the object 50 to correspondingly output an sensing signal. Furthermore, the optical system 100 further includes a processing circuit 130. The processing circuit 130 is, for example, an integrated circuit chip or a microcontroller, but it is not limited thereto.

The processing circuit 130 is configured to analyze the sensing signal, and the processing circuit 130 is configured to output a main judgment signal JS to an external circuit 200 according to the sensing signal. When the optical system 100 is installed on a portable electronic device, the external circuit 200 can be a processor or a controller of the portable electronic device.

Figure 3:
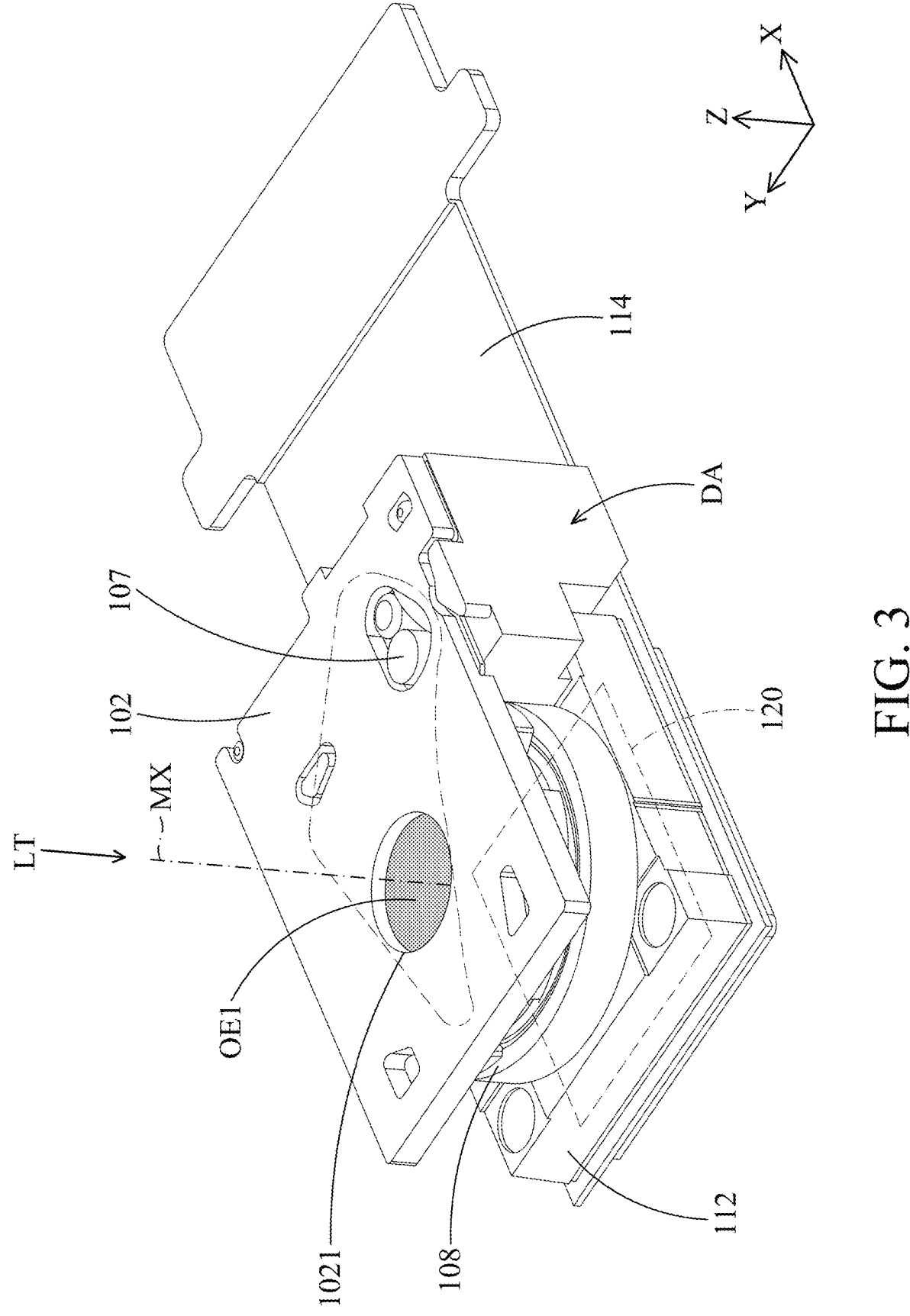
FIG. 3 is a three-dimensional schematic diagram illustrating that the optical element OE1 blocks the first opening 1021 according to an embodiment of the present disclosure.

Next, please refer to FIG. 1 to FIG. 3. FIG. 3 is a three-dimensional schematic diagram illustrating that the optical element OE1 blocks the first opening 1021 according to an embodiment of the present disclosure. As shown in FIG. 3, when the driving assembly DA drives the movable part 107 and the optical element OE1 to move, the characteristics of the light beam incident on the sensing assembly 120 can be changed.

For example, the intensity and the amount of light of the light beam LT received by the sensing assembly 120 can be changed, but it is not limited thereto. In other embodiments, the image clarity or the color of the image generated by the sensing assembly 120 can also be changed.

Figure 4:
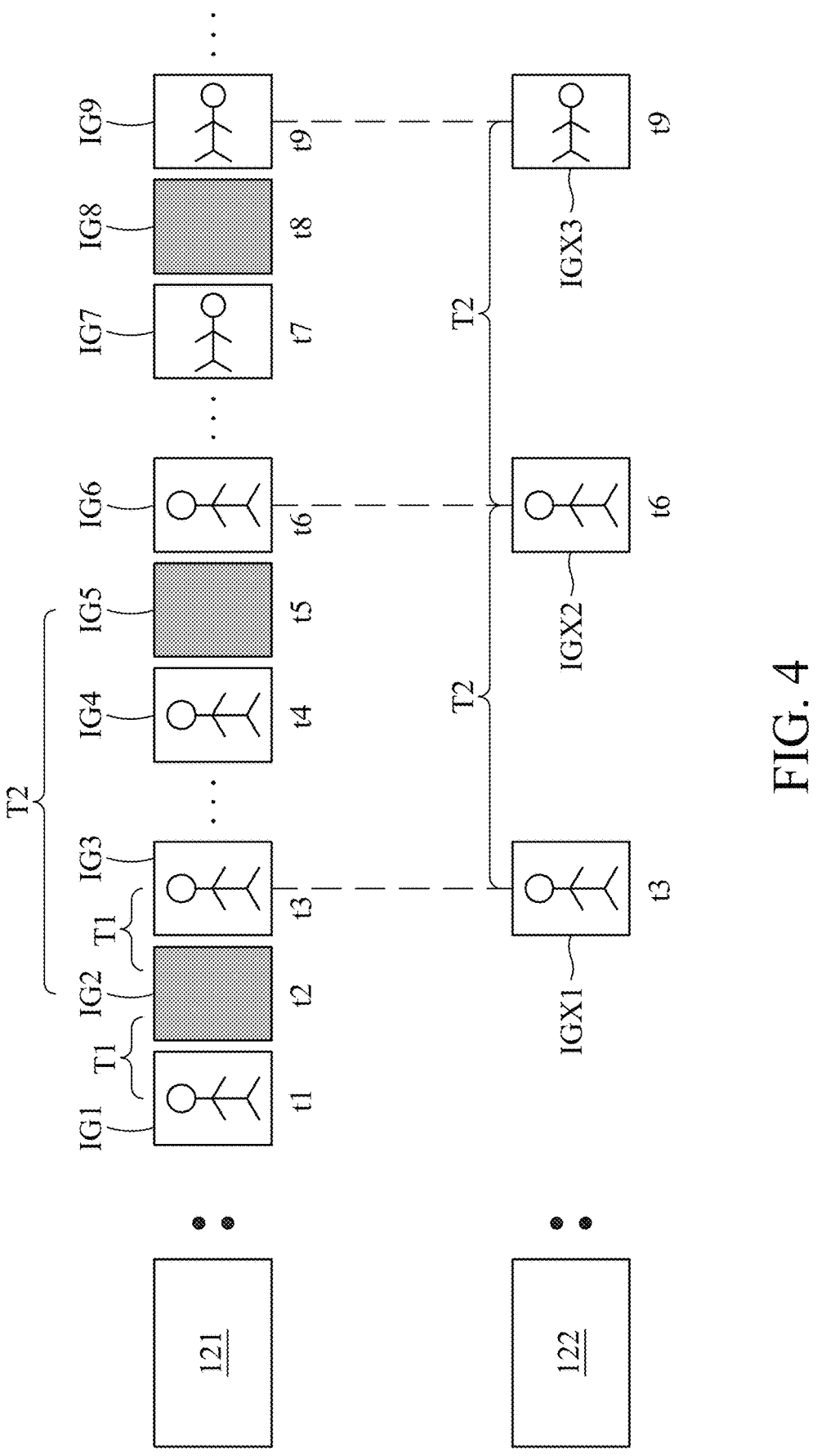
FIG. 4 is a schematic diagram of image signals output by the sensing assembly 120 at different time points according to an embodiment of the present disclosure.

Next, please refer to FIG. 1 to FIG. 4. FIG. 4 is a schematic diagram of image signals output by the sensing assembly 120 at different time points according to an embodiment of the present disclosure. As shown in FIG. 2, the sensing assembly 120 includes a first sensing unit 121 configured to output a first sensing signal SS1 according to the light beam LT.

Specifically, after the sensing assembly 120 receives the light beam LT, the first sensing unit 121 continuously outputs the first sensing signal SS1 to the processing circuit 130. The first sensing signal SS1 is included in the aforementioned sensing signal. Furthermore, in this embodiment, as shown in FIG. 2 and FIG. 4, the sensing assembly 120 periodically outputs the first sensing signal SS1 at a first interval T1 according to the light beam LT.

The first interval T1 is less than 0.1 seconds. For example, the first interval T1 is $\frac{1}{30}$ second or $\frac{1}{60}$ second, but it is not limited thereto. As shown in FIG. 4, the first sensing unit 121 continuously outputs the first sensing signal SS1 to the processing circuit 130 at different time points. Specifically, the first sensing signal SS1 may be an image signal (such as a light intensity signal).

The processing circuit 130 may include a first frame buffer 131 and a comparator 133. The first frame buffer 131 is configured to receive the first sensing signal SS1 and temporarily store it therein, and the comparator 133 is configured to determine whether there is a difference between two or three first sensing signals SS1 that are adjacent but at different time points.

For example, as shown in FIG. 4, the processing circuit 130 is configured to determine whether there is a difference in the first sensing signal SS at a first time point t1, a second time point t2 and a third time point t3. The interval between the first time point t1 and the second time point t2 is equal to the first interval T1, and the interval between the second time point t2 and the third time point t3 is equal to the first interval T1, and so on.

As shown in FIG. 4, the first sensing signal SS1 at the first time point t1 is a first image IG1, the first sensing signal SS1 at the second time point t2 is a second image IG2, and the first sensing signal SS1 at the third time point t3 is a third image IG3. When the comparator 133 of the processing circuit 130 determines that there is a difference in the first sensing signal SS1 from the first time point t1 to the third time point t3, the comparator 133 outputs an enable signal EBS.

In this embodiment, the driving assembly DA changes the state of the optical element OE1 so that there is a difference in the first sensing signal SS1 at different time points. For example, when at the second time point t2, the optical element OE1 can shield the first opening 1021 as shown in FIG. 3, so that the second image IG2 is as shown in FIG. 4.

The second image IG2 is a black image, and the second image IG2 can serve as a trigger signal. When the comparator 133 compares the images of three consecutive time points, if it is determined that one of the images (the second image IG2) is different from the other two images, the black second image IG2 triggers the comparator 133 to output the enable signal. EBS.

Similarly, the first sensing signal SS1 at the time point t4, the time point t5 and the time point t6 are a fourth image IG4, a fifth image IG5 and a sixth image IG6 respectively, and the first sensing signal SS1 at the time point t7, the time point t8 and the time point t9 are a seventh image IG7, an eighth image IG8 and a ninth image IG9 respectively. The comparator 133 can also compare these images according to the aforementioned method to output the enable signal EBS.

Furthermore, the sensing assembly 120 may further include a second sensing unit 122 configured to output a second sensing signal SS2 according to the light beam LT. The second sensing signal SS2 is included in the aforementioned sensing signal. The second sensing unit 122 of the sensing assembly 120 outputs the second sensing signal SS2 to the processing circuit 130 according to the enable signal EBS. As shown in FIG. 2, the processing circuit 130 further includes a second frame buffer 132 configured to receive the second sensing signal SS2 and temporarily store it therein.

As shown in FIG. 4, the second sensing signal SS2 output by the second sensing unit 122 at the third time point t3 may be a first trigger image IGX1. The first trigger image IGX1 may be the same as or different from the third image IG3. For example, the third image IG3 can be a gray level image, and the first trigger image IGX1 can be a full-color image, but they are not limited thereto.

In this embodiment, the driving assembly DA can periodically change the state of the optical element OE1 at a second interval T2 to generate a difference in the first sensing signal SS1. The first interval T1 is different from the second interval T2. For example, the first interval T1 is less than the second interval T2, and the second interval T2 is less than five minutes, but it is not limited thereto. The second interval T2 can also be less than one minute.

For example, the optical element OE1 can shield the first opening 1021 at the time point t5 and the time point t8. Therefore, as shown in FIG. 4, the second sensing unit 122 outputs the second trigger image IGX2 and the third trigger image IGX3 (the second sensing signal SS2) at the time point t6 and the time point t9 respectively.

Next, the comparator 133 of the processing circuit 130 is configured to determine whether there is a difference between the second sensing signals SS2 that are adjacent but at different time points. As shown in FIG. 4, the comparator 133 of the processing circuit 130 is configured to determine whether there is a difference in the second sensing signal SS2 at a fourth time point and a fifth time point.

The fourth time point is, for example, the time point t6, and the fifth time point is, for example, the time point t9, but they are not limited thereto. The interval between the fourth time point and the fifth time point is equal to the second interval T2.

When the comparator 133 of the processing circuit 130 determines that there is a difference between the adjacent second sensing signals SS2 at different time points, the comparator 133 of the processing circuit 130 outputs the main judgment signal JS.

For example, as shown in FIG. 4, when the object 50 (the observed person) falls, comparator 133 determines that there is a difference between the second trigger image IGX2 and the third trigger image IGX3, and then output the main judgment signal JS.

In addition, because the number of images that need to be temporarily stored in the first frame buffer 131 is different from the number of images that need to be temporarily stored in the second frame buffer 132, the capacity of the first frame buffer 131 may be different from the capacity of the second frame buffer 132.

In this embodiment, the capacity of the first frame buffer 131 is greater than the capacity of the second frame buffer 132. For example, the capacity of the first frame buffer 131 is 4M (megabytes), and the capacity of the second frame buffer 132 is 1M, but they are not limited thereto.

Figures 5, 6, 7:
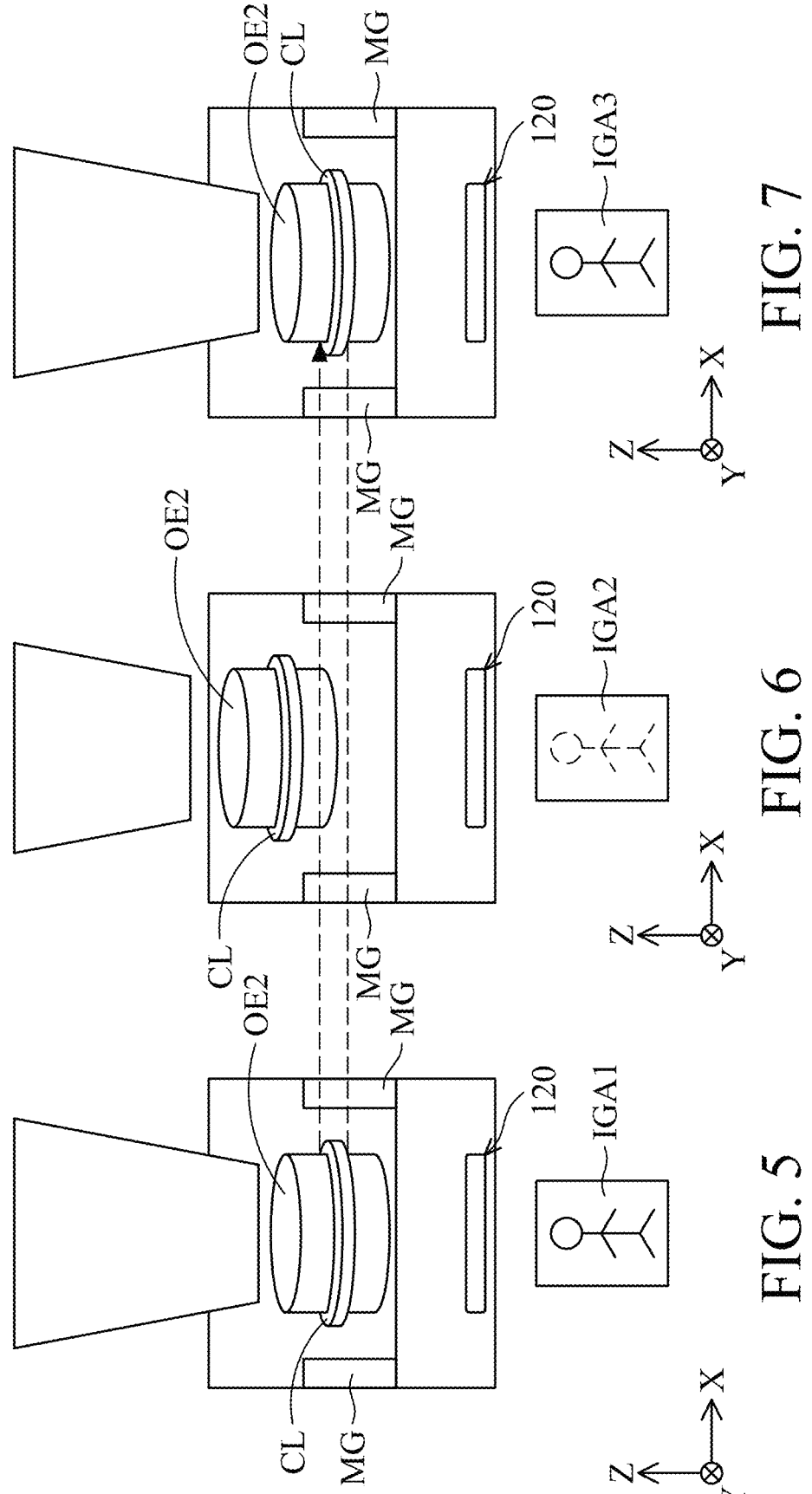
FIG. 5 to FIG. 7 are schematic diagrams of operations of the optical system 100A according to another embodiment of the present disclosure.

Next, please refer to FIG. 4 and FIG. 5 to FIG. 7. FIG. 5 to FIG. 7 are schematic diagrams of operations of the optical system 100A according to another embodiment of the present disclosure. The driving assembly DA may include at least one magnet MG and a coil CL, and the driving assembly DA may drive the optical element OE2 (the camera lens) to move along the Z-axis.

In FIG. 5, when the optical element OE2 is at the first position, the first sensing signal SS1 output by the sensing assembly 120 at the first time point t1 is a first image IGA1, and the first image IGA1 may correspond to the first image IG1 in FIG. 4. The first image IGA1 is a clear image.

Next, in FIG. 6, when the optical element OE2 is moved to a second position by the driving assembly DA, the first sensing signal SS1 output by the sensing assembly 120 at the second time point t2 is a second image IGA2. The second image IGA2 may correspond to the second image IG2 in FIG. 4. Due to the change in focal length, the second image IGA2 is a blurred image.

Finally, in FIG. 7, when the optical element OE2 is moved back to the first position by the driving assembly DA, the first sensing signal SS1 output by the sensing assembly 120 at the third time point t3 is a third image IGA3, and the third image IGA3 may correspond to the third image IG3 in FIG. 4. The third image IGA3 is a clear image.

Then, the processing circuit 130 can make a determination based on the first image IGA1 to the third image IGA3. Because the second image IGA2 is different from the first image IGA1 and the third image IGA3, the processing circuit 130 outputs the enable signal EBS to perform subsequent steps. The subsequent steps are the same as that in the previous embodiment, so they are omitted herein.

Figure 8:
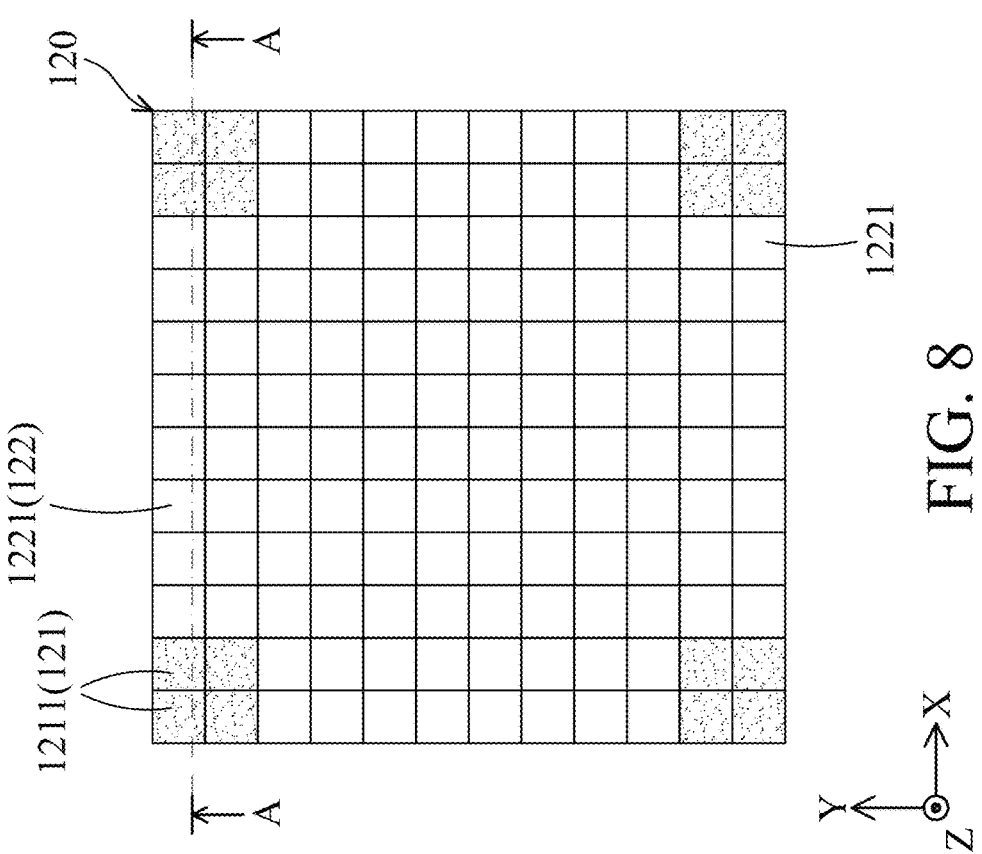
FIG. 8 is a top view of the sensing assembly 120 according to an embodiment of the present disclosure.

Next, please refer to FIG. 2 and FIG. 8. FIG. 8 is a top view of the sensing assembly 120 according to an embodiment of the present disclosure. In this embodiment, the first sensing unit 121 has a plurality of first base units 1211, and the second sensing unit 122 has a plurality of second base units 1221. The first base units 1211 and the second base units 1221 may be pixels of the sensing assembly 120.

As shown in FIG. 8, the first base units 1211 and the second base units 1221 are arranged in different ways. The sensing assembly 120 has a rectangular structure, the first base units 1211 are arranged at four corners of the rectangular structure, and the second base units 1221 are arranged in the rectangular structure in an array manner.

It is worth noting that the number of first base units 1211 is different from the number of second base units 1221.

After the optical system 100 completes the startup process (that is, when the portable electronic device is turned on and the first opening 1021 is not shielded), the first sensing unit 121 remains in an activated state. When the first sensing unit 121 remains in the activated state, the first sensing unit 121 continues to receive the light beam LT and correspondingly output the first sensing signal SS1 to the first frame buffer 131, as shown in FIG. 4.

Furthermore, after the optical system 100 completes the startup process, if the sensing assembly 120 does not receive the enable signal EBS, the second sensing unit 122 remains in a deactivated state. For example, as shown in FIG. 4, at the first time point t1, the second time point t2, the time point t4, the time point t5, the time point t7, the time point t8 and so on, the second sensing unit 122 remains in the deactivated state without consuming power.

Based on the above design, a smaller number of first base units 1211 are used to sense and output the first sensing signal SS1, and the second base units 1221 outputs the image signal (the second sensing signal SS2) only after receiving the enable signal EBS, thereby effectively saving the overall power consumption of the sensing assembly 120.

Figure 9:
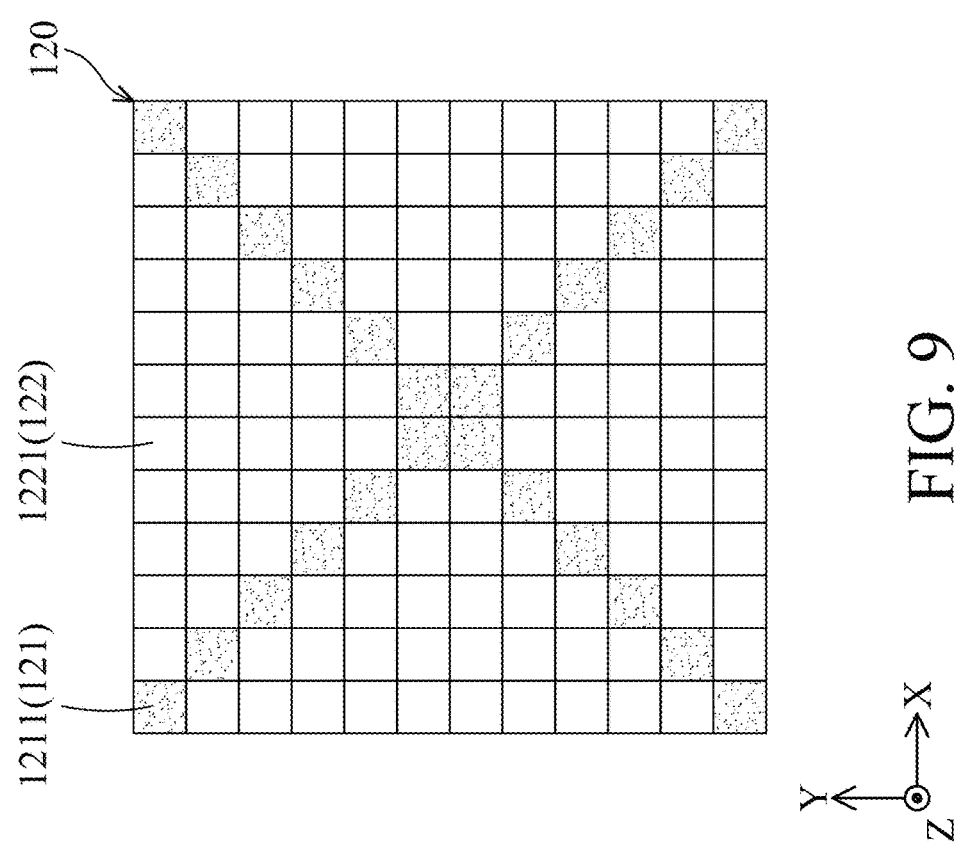
FIG. 9 is a top view of the sensing assembly 120 according to another embodiment of the present disclosure.

Next, please refer to FIG. 9, which is a top view of the sensing assembly 120 according to another embodiment of the present disclosure. In this embodiment, the first base units 1211 are arranged in a crosswise manner in the rectangular structure, and the second base units 1221 are arranged in an array manner in the rectangular structure. The arrangement of the first base units 1211 and the second base units 1221 can be adjusted and configured according to actual needs and are not limited to the above embodiments.

Figures 10, 11:
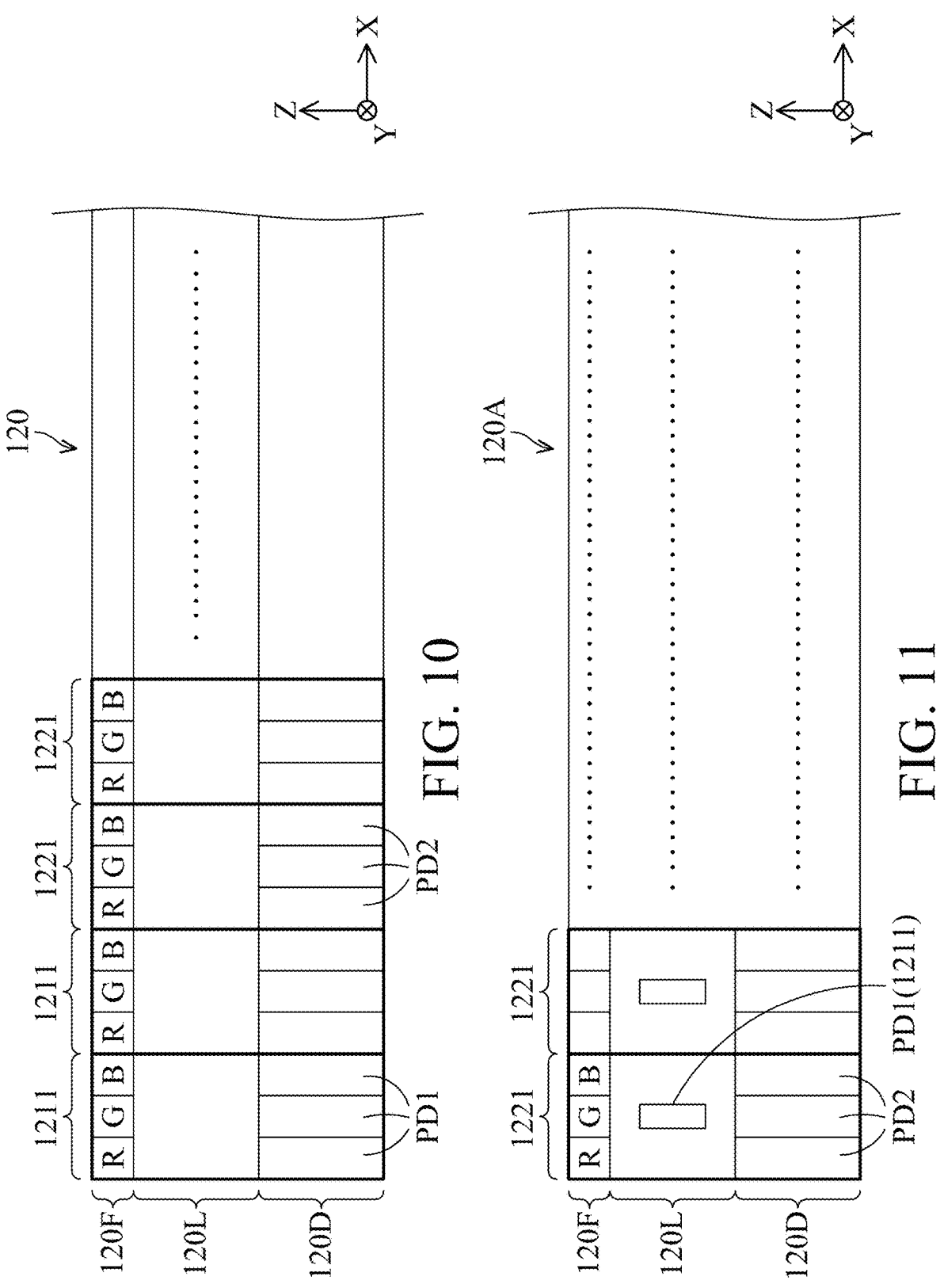
FIG. 10 is a cross-sectional view of the sensing assembly 120 along line A-A in FIG. 8 according to an embodiment of the present disclosure.
FIG. 11 is a cross-sectional view of a sensing assembly 120A according to another embodiment of the present disclosure.

Next, please refer to FIG. 10, which is a cross-sectional view of the sensing assembly 120 along line A-A in FIG. 8 according to an embodiment of the present disclosure. In this embodiment, the first sensing unit 121 may be included in the second sensing unit 122. That is, the first sensing unit 121 can be a part of the second sensing unit 122. That is to say, the first base units 1211 of the first sensing unit 121 and the second base units 1221 of the second sensing unit 122 have the same structure, but can perform different functions.

As shown in FIG. 10, the sensing assembly 120 has a plate-shaped structure and has a filter layer 120F, an electronic circuit layer 120L and a photosensitive layer 120D. The filter layer 120F may have at least one red filter R, at least one green filter G, and at least one blue filter B. The photosensitive layer 120D of the first base unit 1211 may include at least three first photosensitive elements PD1, and the photosensitive layer 120D of the second base unit 1221 may include at least three second photosensitive elements PD2. The electronic circuit layer 120L may include a plurality of electronic circuits (not shown in the figures) configured to transmit signals generated by the photosensitive layer 120D to the processing circuit 130.

When viewed in a direction perpendicular to the sensing assembly 120 (such as viewed along the Z-axis), the filter layer 120F overlaps the electronic circuit layer 120L and the photosensitive layer 120D. The stacking manner of the sensing assembly 120 is not limited to this embodiment. For example, the electronic circuit layer 120L and the photosensitive layer 120D can be interchanged.

As shown in FIG. 10, when viewed in a direction parallel to the sensing assembly 120 (such as viewed along the X-axis), the first base unit 1211 overlaps at least a portion of the second base unit 1221.

Next, please refer to FIG. 11, which is a cross-sectional view of a sensing assembly 120A according to another embodiment of the present disclosure. Similarly, the sensing assembly 120A has a plate-shaped structure, and the sensing assembly 120A has a filter layer 120F, an electronic circuit layer 120L and a photosensitive layer 120D.

When viewed in a direction perpendicular to the sensing assembly 120A (along the Z-axis), the filter layer 120F overlaps the electronic circuit layer 120L and the photosensitive layer 120D, and the first sensing unit 121 is included in the second sensing unit 122.

As shown in FIG. 11, when viewed in a direction perpendicular to the sensing assembly 120A, the first base unit 1211 overlaps at least a portion of the second base unit 1221. Specifically, the first base unit 1211 of this embodiment has a single first photosensitive element PD1 which is disposed in the electronic circuit layer 120L. The first photosensitive element PD1 is, for example, a photodiode, but it is not limited thereto.

Furthermore, the second base unit 1221 has three second photosensitive elements PD2 (the photodiodes), and when viewed in the direction perpendicular to the sensing assembly 120A, the first photosensitive element PD1 overlaps a portion of at least one second photosensitive element PD2.

It should be noted that the width of the first photosensitive element PD1 along the X-axis is less than the width of the second photosensitive element PD2 along the X-axis so as to ensure that the light beam LT can be effectively received by all of the second photosensitive elements PD2.

The present disclosure provides an optical system, including a fixed assembly FA, a movable assembly MA, a driving assembly DA, a sensing assembly 120 and a processing circuit 130. The movable assembly MA is movably connected to the fixed assembly FA. The driving assembly DA is configured to drive the movable assembly MA and the optical element to move relative to the fixed assembly FA. The sensing assembly 120 is configured to sense the light beam LT with respect to the object 50 to correspondingly output a sensing signal, and the processing circuit 130 is configured to analyze the sensing signal.

When the sensing assembly 120 receives the light beam LT, the first sensing unit 121 continuously outputs the first sensing signal SS1 to the processing circuit 130. When the processing circuit 130 determines that there is a difference in the first sensing signal SS1 at different time points, the processing circuit 130 outputs an enable signal EBS. Then, the second sensing unit 122 of the sensing assembly 120 outputs the second sensing signal SS2 to the processing circuit 130 according to the enable signal EBS. When the comparator 133 of the processing circuit 130 determines that there is a difference between the adjacent second sensing signals SS2 at different time points, the main judgment signal JS is output. The main judgment signal JS is, for example, a warning signal configured to notify the external circuit 200 that an abnormality occurs in the currently observed person.

In the present disclosure, a smaller number of first base units 1211 of the first sensing unit 121 are used to sense and output the first sensing signal SS1, and the second base units 1221 of the second sensing unit 122 outputs the image signal (the second sensing signal SS2) only after receiving the enable signal EBS, thereby effectively saving the overall power consumption of the sensing assembly 120, and the observed person can be effectively monitored.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system, comprising:
a sensing assembly configured to sense a light beam and output a sensing signal accordingly, wherein the sensing signal comprises a first sensing signal, and the sensing assembly periodically outputs the first sensing signal at a first interval according to the light beam;
an optical element, wherein the light beam passes through the optical element and is received by the sensing assembly;
a driving assembly, configured to drive the optical element to move so as to change characteristics of the light beam incident on the sensing assembly; and
a processing circuit, configured to analyze the sensing signal,
wherein the processing circuit is configured to output a main judgment signal to an external circuit according to the sensing signal.

2. The optical system as claimed in claim 1, wherein the first interval is less than 0.1 seconds.

3. The optical system as claimed in claim 2, wherein;
the processing circuit is configured to determine whether there is a difference between the first sensing signals that are adjacent but at different time points;
the processing circuit is configured to determine whether there is a difference in the first sensing signal of a first time point, a second time point and a third time point;
an interval between the first time point and the second time point is equal to the first interval; and
an interval between the second time point and the third time point is equal to the first interval.

4. The optical system as claimed in claim 3, wherein when the processing circuit determines that there is a difference in the first sensing signal from the first time point to the third time point, an enable signal is output.

5. The optical system as claimed in claim 4, wherein:
the driving assembly is configured to change a state of the optical element so that there is a difference in the first sensing signal at different time points;
the driving assembly changes the state of the optical element so that the first sensing signal at different time points has a trigger signal; and the processing circuit is configured to output the enable signal according to the trigger signal.

6. The optical system as claimed in claim 5, wherein:
the sensing signal further comprises a second sensing signal; and
the sensing assembly outputs the second sensing signal to the processing circuit according to the enable signal.

7. The optical system as claimed in claim 6, wherein:
the driving assembly is configured to periodically change the state of the optical element at a second interval to generate a difference in the first sensing signal;
the first interval is different from the second interval;
the first interval is less than the second interval; and
the second interval is less than five minutes.

8. The optical system as claimed in claim 7, wherein:
the processing circuit is configured to determine whether there is a difference in the second sensing signals that are adjacent but at different time points;
the processing circuit is configured to determine whether there is a difference in the second sensing signal at a fourth time point and a fifth time point; and
an interval between the fourth time point and the fifth time point is equal to the second interval.

9. The optical system as claimed in claim 8, wherein when the processing circuit determines that there is a difference between the second sensing signals that are adjacent but at different time points, the processing circuit outputs the main judgment signal.

10. The optical system as claimed in claim 9, wherein:
the processing circuit comprises a first frame buffer configured to receive the first sensing signal;
the processing circuit further comprises a second frame buffer configured to receive the second sensing signal;
a capacity of the first frame buffer is different from a capacity of the second frame buffer; and
the capacity of the first frame buffer is greater than the capacity of the second frame buffer.

11. The optical system as claimed in claim 10, wherein:
the processing circuit further comprises a comparator;
the comparator is configured to receive the first sensing signals and determine whether there is a difference between the first sensing signals that are adjacent but at different time points, so as to output the enable signal; and
the comparator is configured to receive the second sensing signals and determine whether there is a difference between the second sensing signals that are adjacent but at different time points, so as to output the main judgment signal.

12. The optical system as claimed in claim 11, wherein:
the sensing assembly comprises a first sensing unit configured to output the first sensing signal according to the light beam; and
the sensing assembly comprises a second sensing unit configured to output the second sensing signal according to the light beam.

13. The optical system as claimed in claim 12, wherein:
the first sensing unit has a plurality of first base units;
the second sensing unit has a plurality of second base units;
the first base units and the second base units are arranged in different ways; and
a number of the first base units is different from a number of the second base units.

14. The optical system as claimed in claim 13, wherein:
after the optical system completes a startup process, the first sensing unit remains in an activated state;

when the first sensing unit remains in the activated state, the first sensing unit continues to receive the light beam and correspondingly outputs the first sensing signal to the first frame buffer; and after the optical system completes the startup process, if the sensing assembly does not receive the enable signal, the second sensing unit remains in a deactivated state.

15. The optical system as claimed in claim 14, wherein; the first sensing unit is included in the second sensing unit;

the sensing assembly has a plate-shaped structure; and when viewed in a direction parallel to the sensing assembly, the first base unit overlaps at least a portion of the second base unit.

16. The optical system as claimed in claim 13, wherein: the sensing assembly has a plate-shaped structure;

the first sensing unit is included in the second sensing unit; and when viewed in a direction perpendicular to the sensing assembly, the first base unit overlaps at least a portion of the second base unit.

17. The optical system as claimed in claim 16, wherein; the sensing assembly has a filter layer, an electronic circuit layer and a photosensitive layer;

when viewed in a direction perpendicular to the sensing assembly, the filter layer overlaps the electronic circuit layer and the photosensitive layer.

18. The optical system as claimed in claim 17, wherein; the first base unit has a first photosensitive element which is disposed in the electronic circuit layer;

the second base unit has at least one second photosensitive element; and when viewed in a direction perpendicular to the sensing assembly, the first photosensitive element overlaps a portion of the at least one second photosensitive element.

* * * * *